(No Model.)

C. H. KNOWLTON.
CAR COUPLING.

No. 369,291. Patented Aug. 30, 1887.

Witnesses.
S. N. Piper.
R. B. Torrey.

Inventor.
Charles H. Knowlton.
by R. H. Eddy atty.

UNITED STATES PATENT OFFICE.

CHARLES HILTON KNOWLTON, OF ROCKLAND, MAINE, ASSIGNOR OF THIRTY-THREE ONE-HUNDREDTHS TO J. P. CILLEY, OF SAME PLACE, AND GEORGE E. BOLTON AND WALTER M. LOWNEY, BOTH OF BOSTON, MASSACHUSETTS.

CAR-COUPLING.

SPECIFICATION forming part of Letters Patent No. 369,291, dated August 30, 1887.

Application filed February 3, 1887. Serial No. 226,361. (No model.)

*To all whom it may concern:*

Be it known that I, CHARLES HILTON KNOWLTON, of Rockland, in the county of Knox, of the State of Maine, have invented a new and useful Improvement in Railway-Car Couplers; and I do hereby declare the same to be described in the following specification and represented in the accompanying drawings, of which—

Figure 1:
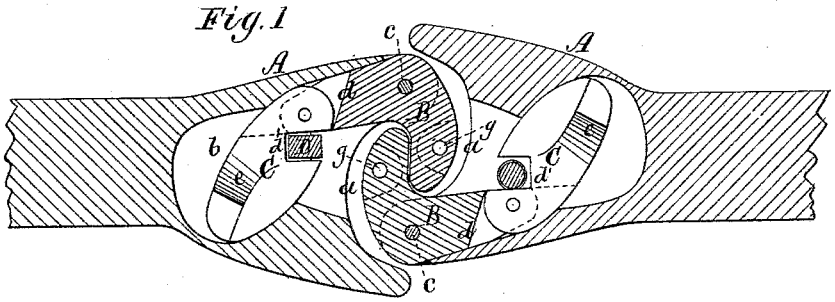
Figure 2:
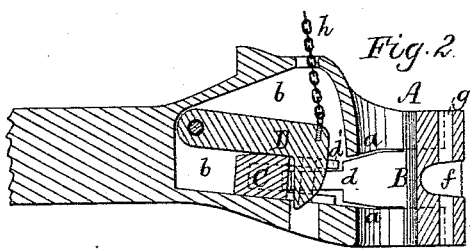
Figure 3:
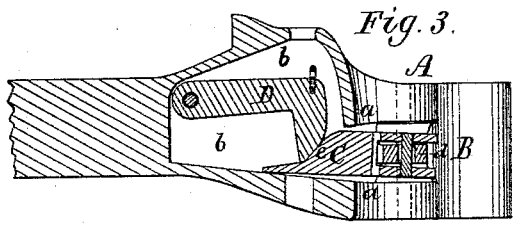
Figure 5:
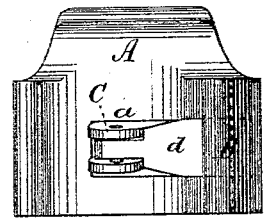
Figure 4:
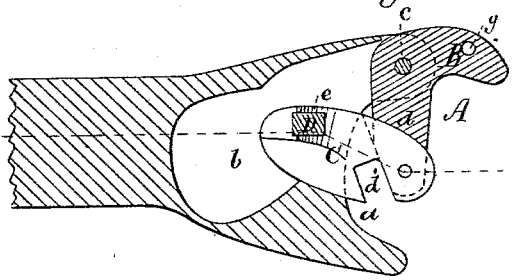
Figure 6:
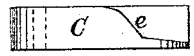

Figure 1 is a horizontal section of a pair of my improved couplers. Fig. 2 is a vertical and longitudinal section of one of them as its parts appear when it is coupled or in connection with the other. Fig. 3 is a vertical and longitudinal section; Fig. 4, a horizontal section, and Fig. 5 is a front end view of it as its parts appear when it is not in engagement with its fellow coupler. Fig. 6 is a side view of the tail-piece C.

The nature of my invention is defined in the claims hereinafter presented.

In such drawings, A denotes the coupler-head, which is provided with a mouth, $a$, and is chambered, as shown at $b$, to receive and allow to operate the hook B, its notched tail-piece C, and the gravitating catch D.

The hook B, formed as shown, is pivoted at or near its middle in the head, and is arranged therein as represented, the pivot being exhibited at $c$. To the shank $d$ of the hook the notched tail-piece C is jointed, such tail-piece being an ellipsoidal-shaped block having in its front part a notch, $d'$. Besides such notch, there is in the tail-piece a depression or chute, $e$, formed as shown in top view in Figs. 1 and 4 and in side elevation in Fig. 6. The point of the catch D rests on this chute when the tail-piece is in the positions as shown in Figs. 3 and 4, the chute and catch under such circumstances serving to hold the hook in position for engagement with that of the fellow coupler.

The catch D is a hook pivoted in the rear part of the chamber of the head, so as to swing vertically therein. Instead of the catch a pin going vertically through the head and the notch in the tail-piece, when the hook B is in position as shown in Fig 1, may be substituted.

To connect this coupler with a railway-car by a common link I have a recess or notch, $f$, in the front of the hook B, and I also have a hole, $g$, extending down through the hook and such notch, such hole being to receive the pin.

In order to couple two cars, the hook B, the tail-piece C, and the catch D of one should be in positions as shown in Figs. 1 and 2, and the hook B, tail-piece C, and catch D of the other car should be in the positions as shown in Figs. 3 and 4. On the couplers meeting the hook, fastened in position by its catch and tail-piece, will be moved against the shank of the unfastened hook, and as a consequence such shank and the tail-piece C thereof will be pressed rearwardly, whereby the unfastened hook will be turned into engagement or caused to lock upon the fastened hook, the catch D of tail-piece of the hook B so turned dropping into the notch of the tail-piece, and thereby holding the said hook B in its position or in engagement with its fellow hook. To disengage them the catch must first be pulled upward by a line or chain, $h$, attached to the catch D, (see Fig. 2,) after which one car should be moved away from the other. On the cars being uncoupled the catch will rest against the chute, and in so doing will, while the car may be in the act of being moved on the railway, operate to keep the hook in place ready for coupling with that of another car. The bottom of the chamber of the head is inclined, as shown in Fig. 3, the inclination serving to aid in keeping the hook and the tail-piece in their advanced positions.

I claim—

1. The car-coupler, substantially as described, consisting of the chambered head A, the hook B, pivoted therein, the notched tail-piece C, jointed to the shank of the hook, and the catch D, arranged in and pivoted to the head and to operate with the tail-piece, as specified.

2. The car-coupler consisting of the chambered head A, the hook B, pivoted therein, the tail-piece C, jointed to the shank of the hook and provided with the notch d' and chute e, and the catch D, all being arranged and applied substantially and to operate as represented.

3. The combination of the head provided with the inclined bottom to its chamber, with the hook B, the tail-piece C, and the catch D, arranged with each other and constructed and applied to such head and its chamber, substantially as set forth.

CHARLES HILTON KNOWLTON.

Witnesses:
R. H. EDDY,
R. B. TORREY.